United States Patent
Fitzgibbon

(10) Patent No.: US 6,895,355 B2
(45) Date of Patent: May 17, 2005

(54) METHOD AND APPARATUS FOR CALIBRATING AN INCREMENTAL COUNT OF MOVEMENT

(75) Inventor: James Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 19 days.

(21) Appl. No.: 10/261,815

(22) Filed: Oct. 1, 2002

(65) Prior Publication Data

US 2004/0064287 A1 Apr. 1, 2004

(51) Int. Cl.⁷ .............................................. G06F 15/00
(52) U.S. Cl. .................. 702/145; 250/231.13; 318/282
(58) Field of Search ....................... 250/231.13, 231.14; 318/139, 282, 802; 702/145, 150

(56) References Cited

U.S. PATENT DOCUMENTS

| | | | |
|---|---|---|---|
| 4,888,531 A | * 12/1989 | Hormann | .................... 318/282 |
| 6,051,947 A | * 4/2000 | Lhotak et al. | .............. 318/445 |
| 6,400,112 B1 | 6/2002 | Fitzgibbon et al. | |
| 2003/0164061 A1 | * 9/2003 | Hormann | ..................... 74/724 |

* cited by examiner

Primary Examiner—John Barlow
Assistant Examiner—Stephen J. Cherry
(74) Attorney, Agent, or Firm—Fitch, Even, Tabin & Flannery

(57) ABSTRACT

An operator controller 10 controls a motor 12 via a motor controller (11). The motor (12), in turn, selectively controls movement of an object (such as a movable barrier) along a substantially predetermined path. An incremental movement sensor (13) monitors movement of the object by monitoring, in one embodiment, movement associated with operation of the motor (12). At the same time, a passpoint event generator (15) generates at least some passpoint events that are uniquely identifiable. When a given predetermined passpoint event is detected, the incremental movement sensor activity is potentially recalibrated.

44 Claims, 6 Drawing Sheets

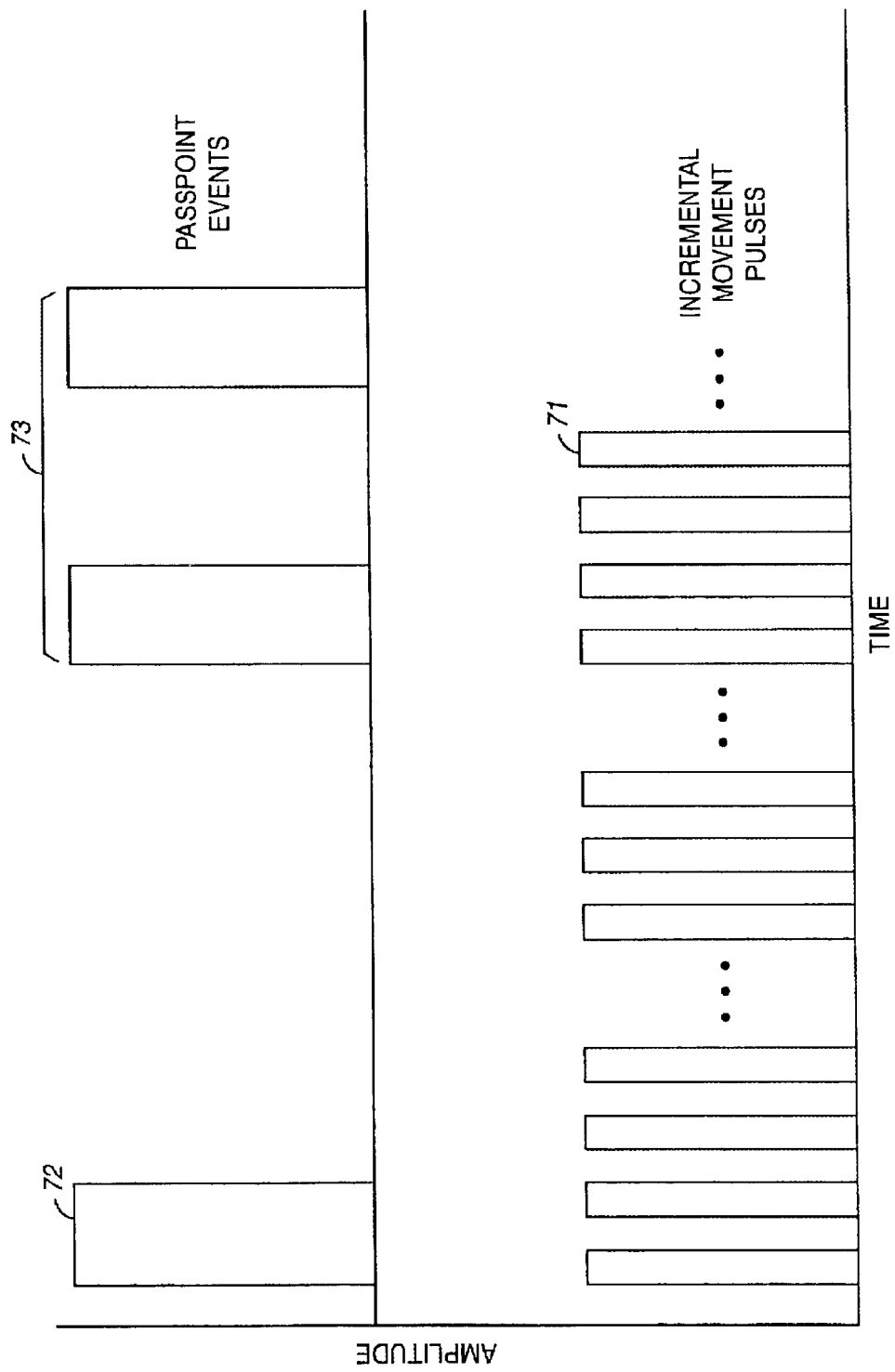

METHOD AND APPARATUS FOR CALIBRATING AN INCREMENTAL COUNT OF MOVEMENT

TECHNICAL FIELD

This invention relates generally to the monitoring of movement and more particularly to the monitoring of movement of an object along a substantially predetermined path.

BACKGROUND

Various ways are known to monitor the movement of moving objects, including objects that tend to move along a substantially predetermined path. For example, some movable barriers, such as garage doors, move along a predetermined path between opened and closed positions. By monitoring the movement of such an object, various benefits can be elicited. For example, careful monitoring of the movement of a movable barrier can support concurrent determinations regarding the likely position of the movable barrier. Such position information can be used in various ways, as is known, to facilitate both safe and efficient operation of such an apparatus.

By maintaining a count that relates to movement of an object between a first and second position (for example, by incrementing a count that correlates to revolutions of a motor output shaft, which shaft is driving movement of the object itself) a system controller can ascertain a likely position of the moving object with respect to those two positions. Unfortunately, as is known, maintaining a count that initiates at one position and continues through travel to the other position can sometimes present inaccurate results. Such inaccuracy results in part due to the tendency of the first and second positions to drift somewhat over time as a result of any number of contributing factors (including errors potentially introduced during power outages and error accrual at the terminus positions over time).

One well known system for monitoring such movement of an object between first and second positions makes use of a so-called passpoint event. The passpoint event typically comprises a signal that corresponds to a position of the moving object that is located between the first and second positions and hence is somewhat less likely to become quickly uncalibrated and then lead to inaccurate results. By resetting the count upon detecting the passpoint, overall accuracy and reliability of the count can be enhanced.

While such passpoint systems in fact provide accurate results under most operating conditions, unfortunately, even such passpoint systems are not immune to accuracy concerns under all operating conditions. For example, many movable barrier operator systems must be designed to accommodate a wide range of potential barrier travel distances (typically ranging from five to fourteen feet). A passpoint that is positioned at the seven foot mid-travel point of the fourteen foot range will function properly with a fourteen foot installation. Such a passpoint, however, would be potentially completely outside the operating range of the five foot installation. A similar problem can arise when the passpoint is set too closely to one of the terminus positions.

In general, such issues can be avoided through exercise of appropriate care during installation. For a variety of reasons, however, such care cannot always be ensured. Either through ignorance or intent, an installer can install a movable barrier operator system with the passpoint poorly chosen. As a result, the incremental count that represents movement (and hence position) of the movable barrier can be inaccurate from time to time.

BRIEF DESCRIPTION OF THE DRAWINGS

The above needs are at least partially met through provision of the method and apparatus for calibrating an incremental count of movement described in the following detailed description, particularly when studied in conjunction with the drawings, wherein:

FIG. 7 comprises a timing diagram depicting illustrative operation in accordance with an embodiment of the invention;

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a process monitors incremental movement of an object along a substantially predetermined path. Passpoint events are automatically detected as they occur during such movement. Pursuant to a preferred embodiment, at least some of these passpoint events are characterized by at least one indicia that uniquely identifies the passpoint as being a particular passpoint (i.e., a single corresponding passpoint as distinct from other passpoints that may be provided). Upon determining that such a detected passpoint comprises a particular previously accepted passpoint (by using, for example, the unique indicia for that passpoint), the process automatically calibrates the incremental movement monitoring as a function, at least in part, of the passpoint event.

In one embodiment, for example, up to four distinct passpoint events can be provided wherein each such passpoint event is characterized by a unique indicia that identifies and distinguishes each corresponding passpoint event from the other three passpoint events. So configured, a sufficient number of passpoint events can be provided to ensure that at least one useful passpoint event will be encountered for any conceivable installation barrier travel length and/or initial passpoint position installation.

In one embodiment, an incremental count that corresponds to movement of an object can be re-initialized upon detecting the particular previously accepted passpoint but not upon detecting any other passpoint. In another embodiment, if desired, the incremental count can be re-initialized upon detecting any of the passpoints (that is, all of the plurality of passpoints can be previously accepted and identified as valid passpoints). In yet another embodiment, rather than re-initializing the count (to, for example, zero), the count can be set to some other predetermined value of choice.

Figure 1:
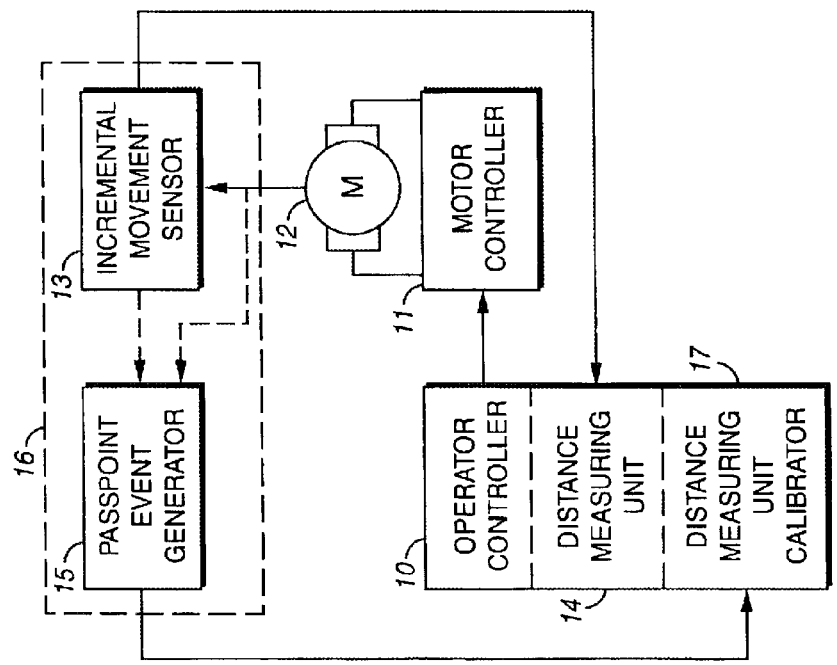
FIG. 1 comprises a block diagram depiction of a movable barrier operator system as configured in accordance with an embodiment of the invention.

Referring now to the drawings, and in particular to FIG. 1, an embodiment comprising a movable barrier operator system will be used to illustrate the concepts taught herein. The movable barrier operator system can be used with any of a variety of moving barriers, including but not limited to garage doors (both segmented and non-segmented styles), sliding and swinging gates, rolling shutters, and the like. Such moving objects typically move from a first location (such as a fully opened position) to a second position (such as a fully closed position) wherein the first location is different from the second position. It should be understood that these embodiments are similarly compatible and useful with moving objects that move in a closed loop from a given location along a substantially predetermined path back to that same given starting location (such that the first location is the same as the second position).

An operator controller 10 couples in known fashion to a motor controller 11 to thereby effect control over a corresponding motor 12. The motor 12 will typically be coupled via an appropriate drive mechanism (not shown) to a moving barrier. Selective operation of the motor 12 will therefore cause corresponding selective movement of the moving barrier.

An incremental movement sensor 13 of choice operably couples to the motor 12 and serves to monitor incremental movement of the movable barrier. In particular, movement of, for example, the output shaft of the motor 12 can be monitored and correlated to corresponding movement of the moveable barrier. There are various known ways to monitor such incremental movement including various ways to monitor the revolutions of an output shaft (or of another object that revolves or moves as a function of the output shaft of the motor 12). For example, Hall effect sensors are sometimes used for this purpose. For purposes of this embodiment, the incremental movement sensor 13 can be comprised of an optical sensor assembly wherein one or more beams of photonic energy are affected in some predetermined fashion as a function of movement by the motor 12. Additional description appears below with respect to specific embodiments in this regard.

The incremental movement sensor 13 provides electric pulses representing the desired monitored movement parameter to a distance measuring unit 14. The distance measuring unit 14 serves, in general, to maintain a count of such electric pulses. When properly calibrated in accordance with well understood prior art technique, such a count can, under appropriate operating circumstances, reliably correspond to a given distance traveled by the movable object. The distance measuring unit 14 can be comprised of a stand-alone circuit. In a preferred embodiment, however, the distance measuring unit 14 comprises a part of the operator controller 10 (wherein the latter comprises a programmable platform such as a microprocessor, microcontroller, or programmable gate array that can be readily configured to support the distance measuring activity).

With continued reference to FIG. 1, a passpoint event generator 15 also responds to movement information that relates to the movable barrier. As appropriate to the given application, such movement information can be obtained from the incremental movement sensor 13 itself and/or from the motor 12. Other sources of movement information can also be used as desired and as available. Pursuant to a preferred embodiment, the passpoint event generator 15 serves to provide a plurality of passpoint events as the object being monitored moves along its substantially predetermined path. At least one of these passpoint events, and preferably (but not necessarily) all of these passpoint events comprise or are otherwise characterized by a corresponding unique indicia or identifier that uniquely identifies the particular passpoint. As will be shown below, such unique indicia can comprise, at least in part, a unique number of electric pulses. Such pulses, as will also be shown below, can be generated in a variety of ways including through use of geared wheels having predetermined energy-interface patterns disposed thereon.

The exact number of passpoint events that a given passpoint event generator 15 can potentially create can be determined as appropriate to a given application. For a movable barrier that can potentially traverse anywhere from five to fourteen feet, about four such passpoint events that are substantially equally spaced from one another will serve well. If desired, the passpoint event generator 15 can be comprised of an independent stand-alone unit or can be combined or integrated with other components of the system as desired. For example, in a preferred embodiment, the passpoint event generator 15 is integrally combined with the incremental movement sensor 13 as a combined movement sensor unit 16.

The passpoint event generator 15 provides the passpoint events (typically comprising corresponding electric pulses as described below in more detail) to a distance measuring unit calibrator 17. This unit 17, as described below, serves to determine whether any given passpoint event is a particular passpoint event that should serve as a trigger to calibrate the count being maintained by the distance measuring unit 14 in some predetermined way (such as by re-initializing the count). In particular, in a preferred embodiment, such a triggering passpoint will have a corresponding unique identifier that the distance measuring unit calibrator 17 has been conditioned to recognize to thereby permit the selective calibration activity as described.

Figure 2:
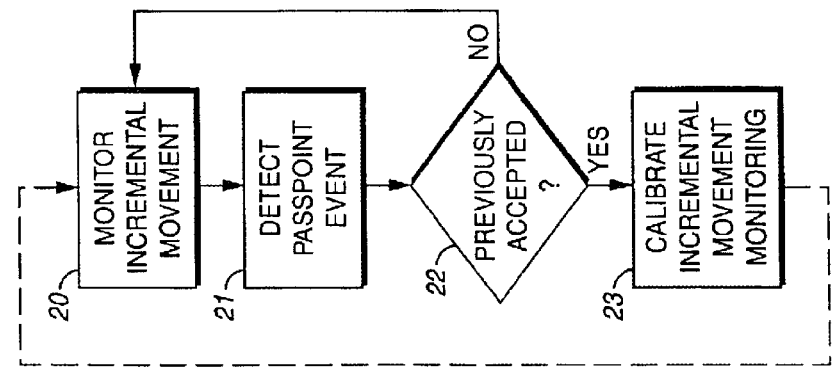
FIG. 2 comprises a flow diagram as configured in accordance with an embodiment of the invention.

As already alluded to, and referring now to FIG. 2, the platform as described above comprises one embodiment for realizing a method whereby incremental movement of an object (such as, but not limited to, a movable barrier) is monitored 20. Such monitoring occurs, in one embodiment, as a function of revolutions per minute of a movable barrier motive mechanism such as a motor. Passpoint events are then detected 21 as they occur during movement of the object along the substantially predetermined pathway. As already noted, some, and preferably all of these passpoint events will be characterized by a unique identifier such that a comparison can be made to determine 22 whether the detected passpoint event comprises a previously accepted or validated passpoint event. If not true, meaning that the detected passpoint event is not a previously identified calibration-purpose passpoint event, the process simply repeats. When a previously accepted passpoint event is detected, however, the process then automatically causes calibration 23 of the incremental movement monitoring activity. In a preferred embodiment, the above-described process then continues to repeat as needed and appropriate.

In one embodiment, the calibration can be realized through re-initialization of the count that is maintained by the distance measuring unit 14. For example, if the count had reached "145" just prior to detecting the calibration-purpose passpoint event, the count could simply be reset to zero. Pursuant to another embodiment, the present count could be compared against a predetermined value to confirm the present count as being accurate. Pursuant to yet another embodiment, the count could be modified in some other predetermined fashion (such as, for example, by being adjusted to some predetermined non-zero value—such modifications could consist of changing the count by either effectively advancing or retarding the count as desired).

So configured, it can be seen that although many passpoint events are generated, in at least some embodiments, only preselected ones of these passpoint events will actually cause a calibration activity such as re-initialization to occur. The preselected passpoint event can be selected at the factory, by the user, or can be automatically selected. For example, subsequent to installation and during a learning mode, the operator controller 10 can begin with the movable barrier at a fully closed position. Upon moving the movable barrier towards an open position, the operator controller 10 could then monitor for a first passpoint event. Upon detecting such a first passpoint event, the operator controller 10 could then assign and select that particular passpoint event as being the calibration trigger described above. Other selection strategies are of course available. For example, all passpoint events could be detected while opening the movable barrier during a learning mode. A subsequent decision could then be made to select one or more of the detected passpoint events as the calibration trigger. As one example, a first passpoint event could be selected when only one passpoint event is sensed (as may occur with a relatively short movable barrier travel distance) and a second passpoint event could be selected when at least two passpoint event are sensed (as may occur with a longer movable barrier travel distance).

Figure 3:
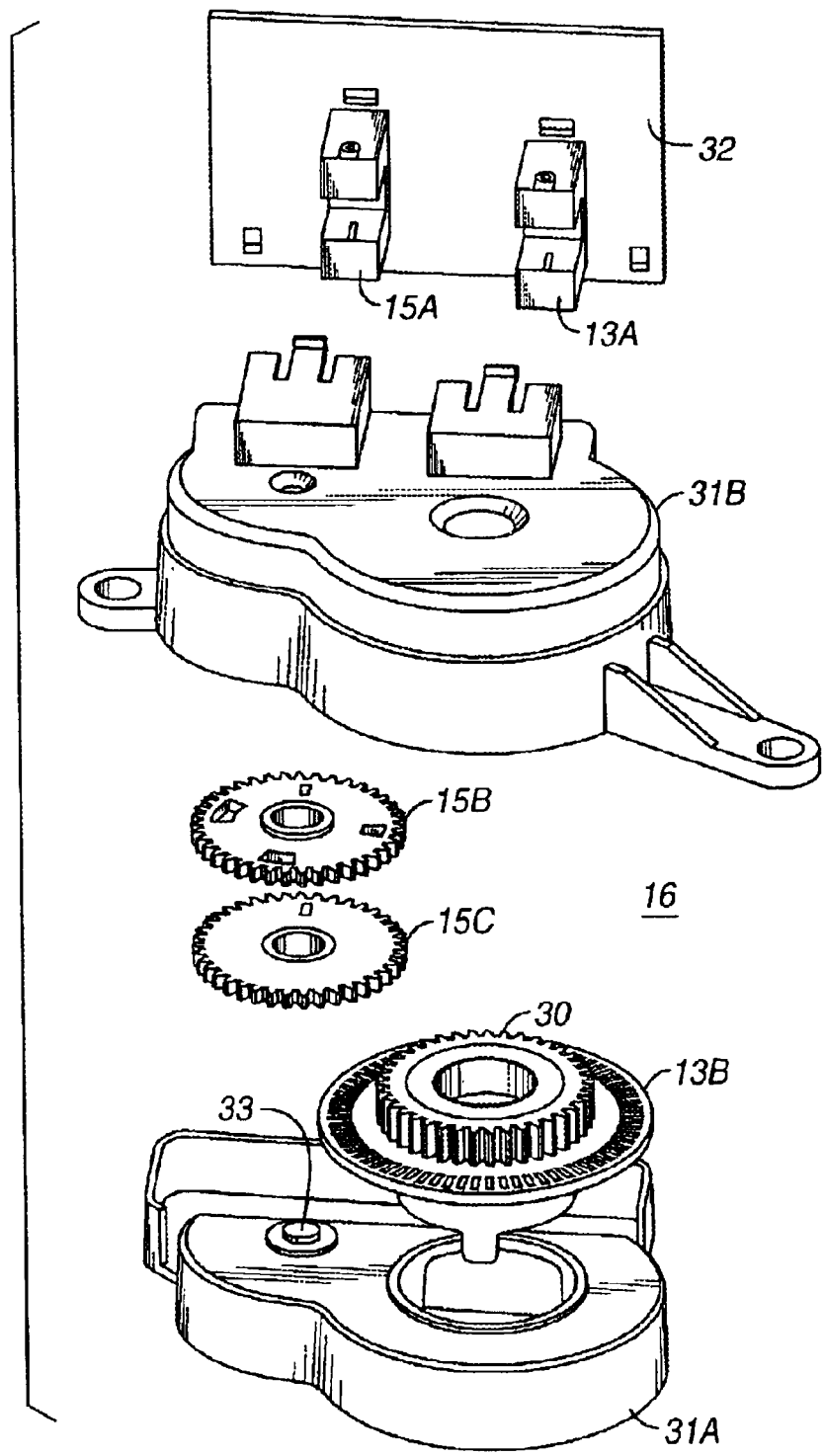
FIG. 3 comprises an exploded perspective view of a combined incremental movement sensor and passpoint event generator 1 as configured in accordance with an embodiment of the invention.
Figure 4:
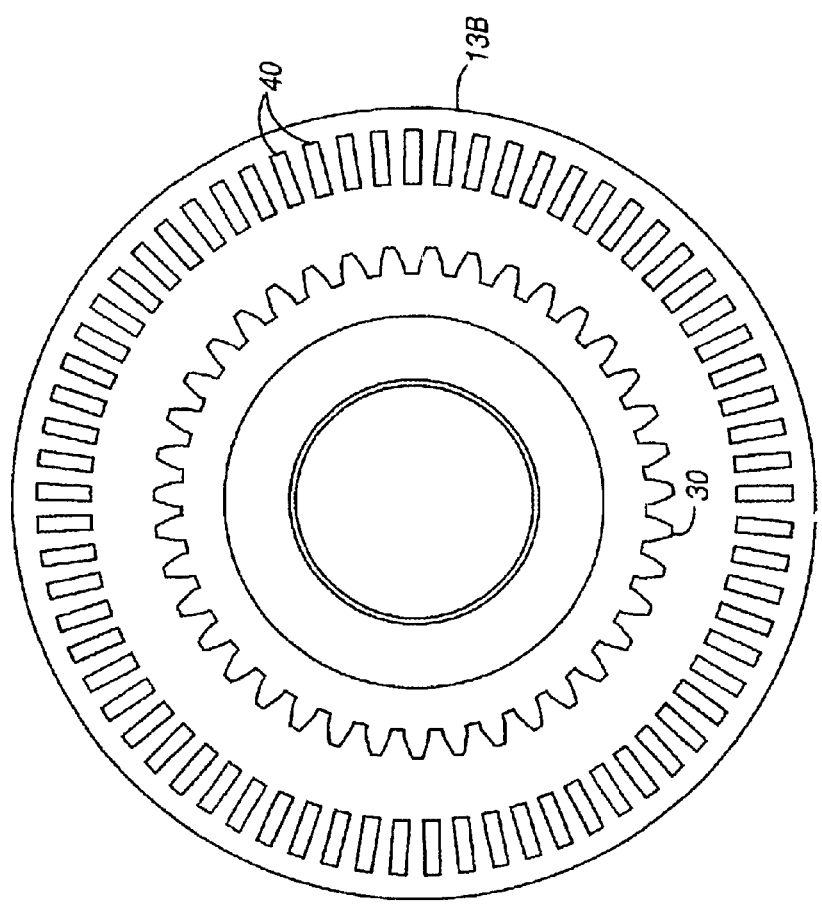
FIG. 4 comprises a top plan view of a geared wheel that comprises a part of an incremental movement sensor as configured in accordance with an embodiment of the invention.

Referring now to FIG. 3, a specific embodiment for an integrated incremental movement sensor 13 and passpoint generation generator 15 will be described. The incremental movement sensor can be as already found on many movable barrier operators. As such, it can comprise of a photobeam source and sensor 13A as conveniently mounted on an appropriate wiring board 32 and a geared wheel 13B. With momentary reference to FIG. 4, the geared wheel 13B of the incremental movement sensor includes gear teeth 30 that mesh as described below with components of the passpoint event generator 15. The geared wheel 13B turns as well understood in the art as a function of the turning of the motor output shaft (not shown). So configured, this geared wheel 13B will rotate about its axis as the motor output shaft turns.

This geared wheel 13B also includes an energy-interface pattern comprising, in this embodiment, a plurality of light-passing apertures 40 disposed regularly about the periphery of the geared wheel 13B. By disposing the edge of the geared wheel 13B between the source and sensor of the photobeam module 13A, turning of the geared wheel 13B can be reliably sensed as the photobeam is interrupted or passed as corresponds to the relative positioning of the apertures 40. So configured, as the motor output shaft moves, the incremental movement sensor geared wheel 13B will rotate and interrupt the photobeam with a regularity that correlates to the rotation of the motor output shaft. Interruptions to the photobeam, in turn, give rise to a corresponding series of electric pulses 71 such as those depicted in FIG. 7. Pulses such as these can be counted by the distance measuring unit 14 as described above to thereby monitor the incremental movement of the movable barrier.

The resolution by which the incremental movement sensor 13 can monitor such movement comprises a function, at least in part, of the number of apertures that are provided in the geared wheel 13B. By doubling, for example, the number of apertures 40, one could conceivably significantly increase the monitoring resolution. In a similar fashion, where the application is less sensitive to fine resolution, fewer apertures could be employed.

As shown, the energy-interface pattern comprises a plurality of apertures that substantially pass the photonic energy of interest (coupled, of course, with intervening material that substantially occludes the photonic energy). If desired, other approaches could be used. For example, reflective surfaces could be used when using an appropriately positioned source and sensor.

Figure 8:
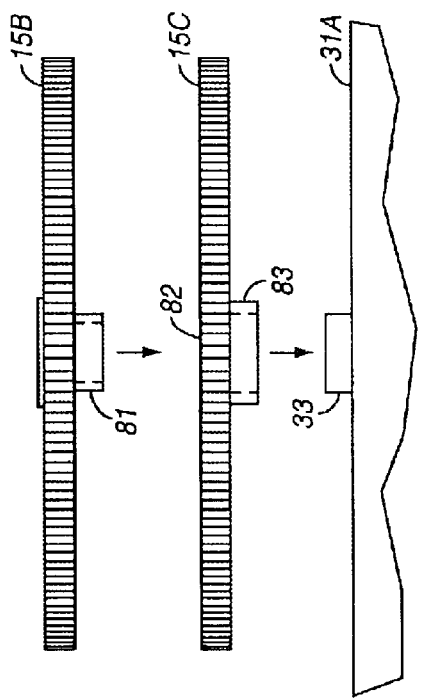
FIG. 8 comprises an exploded side elevational detail of two geared wheels that comprise a part of a passpoint generator as configured in accordance with an embodiment of the invention.

Referring again to FIG. 3, the passpoint event generator 15 includes another photobeam source and sensor 15A and two geared wheels 15B and 15C. Both geared wheels 15B and 15C are arranged and configured to align co-axially with and freely revolve about a small hub 33. More particularly, and referring momentarily to FIG. 8, the first geared wheel 15B has a small cylindrically-shaped axle 81 that extends downwardly and into a corresponding hole 82 in the second geared wheel 15C. In turn, the second geared wheel 15C also has a small cylindrically-shaped axle 83 that extends downwardly and substantially conformally about the hub 33 mentioned earlier. So configured, the two geared wheels 15B and 15C are disposed closely and co-axially to one another but are free to rotate independently of one another. Referring again to FIG. 3, when the two geared wheels 15B and 15C of the passpoint event generator 15 are so disposed, the gear teeth on the perimeter of these geared wheels 15B and 15C will engage the gear teeth on the incremental movement sensor wheel 13B. Therefore, as the incremental movement sensor wheel 13B rotates in response to rotation of the motor output shaft, the two geared wheels 15B and 15C of the passpoint event generator 15 will rotate (at different velocities as compared to one another) as well.

Figure 5:
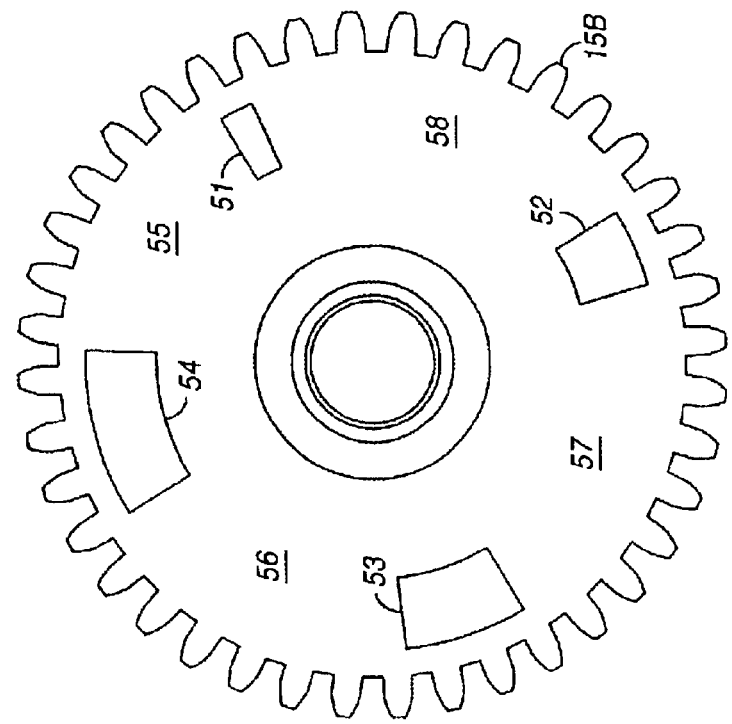
FIG. 5 comprises a top plan view of a first geared wheel that comprises a part of a passpoint event generator as configured in accordance with an embodiment of the invention.

Referring now to FIG. 5, the first geared wheel 15B of the passpoint event generator 15 has, in this embodiment, 40 gear teeth disposed substantially uniformly about the periphery thereof. In addition, this wheel 15B has a particular energy-interface pattern disposed thereon. The purpose of the pattern is to interact with a predetermined type of photonic energy in a predetermined way. In particular, in this embodiment, the pattern includes four apertures 51 through 54 that substantially pass light energy therethrough and four intervening areas 55 through 58 that substantially occlude the passage of light energy. Therefore, as this wheel 15B rotates in response to rotation of the motor output shaft, the photobeam from the passpoint event generator photobeam source and sensor 15A will pass unimpeded or will be occluded depending upon whether the photobeam is aligned with one of the apertures 51 through 54 or one of the occluding areas 55 through 58.

It can also be seen that the four apertures 51 through 54 are not of equal size. A second one 52 of the apertures is essentially twice as wide as a first one 51 of the apertures. A third one 53 of the apertures is essentially three times as wide as the first one 51 of the apertures. And a fourth one 54 of the apertures is essentially four times as wide as the first one 51 of the apertures. So configured, and as described in more detail below, the passpoint event generator 15 is able to generate four passpoint events that are distinct from one another. The differences between the passpoint events, in this embodiment, are primarily achieved as a function of the differences in size between these apertures on this geared wheel 15B.

Figure 6:
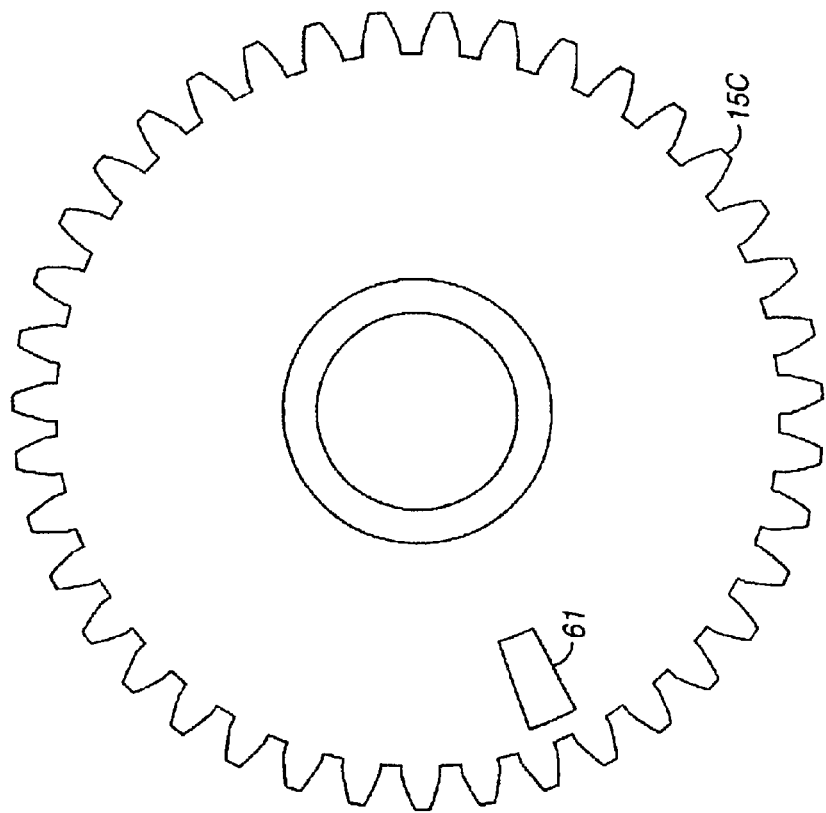
FIG. 6 comprises a top plan view of a second geared wheel that comprises a part of a passpoint event generator as configured in accordance with an embodiment of the invention.

Referring now to FIG. 6, the second geared wheel 15C of the passpoint event generator 15 has, in this embodiment, only 39 gear teeth disposed about its periphery as versus the 40 gear teeth of the first geared wheel 15B. Therefore, these two geared wheels 15B and 15C do not rotate in unison with rotation of the geared surface 30 on the incremental movement sensor wheel 13B. Instead, this second geared wheel 15C moves slightly faster than the first geared wheel 15B. It can also be seen that, in this embodiment, the second geared wheel 15C has only a single light-passing aperture 61 with the rest of the wheel 15C being comprised of a substantially light occluding material.

So configured, and when these two geared wheels 15B and 15C are co-axially aligned as described above, from time to time as the two wheels 15B and 15C rotate at different respective velocities with respect to one another, the single aperture 61 of the second wheel 15C will become aligned with one of the apertures 51 through 54 of the first wheel 15B. Such alignment comprises, in this embodiment, a passpoint event. When this occurs, light from the photobeam source can be detected by the corresponding sensor. Sensing such light permits detection of the passpoint event.

Figure 11:
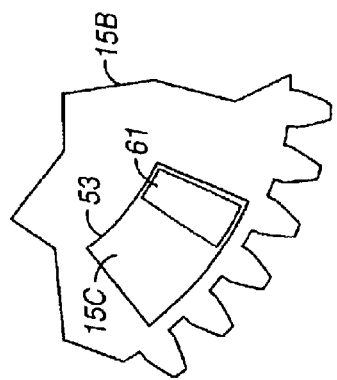
FIG. 11 comprises a top plan detailed view of a portion of the two geared wheels that comprise a part of a passpoint generator as configured in accordance with an embodiment of the invention.
Figure 10:
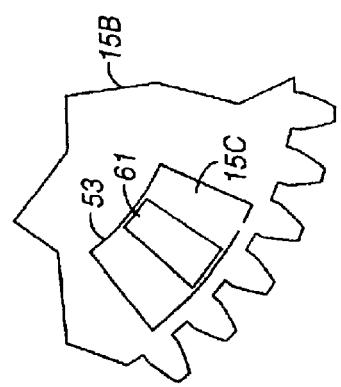
FIG. 10 comprises a top plan detailed view of a portion of the two geared wheels that comprise a part of a passpoint generator as configured in accordance with an embodiment of the invention.
Figure 9:
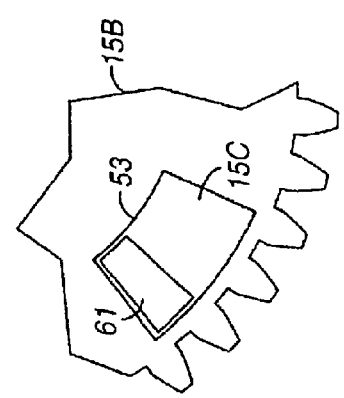
FIG. 9 comprises a top plan detailed view of a portion of the two geared wheels that comprise a part of a passpoint generator as configured in accordance with an embodiment of the invention.

The width of the aperture 61 on the second wheel 15C is relatively close to the width of the smallest aperture 51 on the first wheel 15B (though preferably the second wheel aperture 61 will be at least somewhat wider). Because the second wheel 15C rotates slightly more quickly than the first wheel 15B, the location of the second wheel aperture 61 will precess with respect to the apertures 51 through 54 on the first wheel 15B. For example, when the second wheel aperture 61 first aligns with, say, the third largest aperture 53 of the first wheel 15B, the second wheel aperture 61 will align near an edge of the first wheel aperture 53 as shown in FIG. 9. With the next rotation of both wheels 15B and 15C, the apertures will again align, only this time the second wheel aperture 61 will have precessed forward and will therefore be positioned more centrally with respect to the first wheel aperture 53 as shown in FIG. 10. And similarly, with the next rotation, the second wheel aperture 61 will have precessed to the other side of the first wheel aperture 53 as shown in FIG. 11. With the next precession, of course, the second wheel aperture 61 will have precessed sufficiently far that the apertures will no longer be aligned with the photobeam and hence the photobeam will again be occluded.

With reference to FIG. 7, when only the smallest aperture 51 of the first wheel 15B aligns with the second wheel aperture 61, only a single electric pulse 72 will result. When, however, the next aperture 52 of the first wheel 15B aligns during each of two successive full rotations of the wheels 15B and 15C, two such pulses 73 will result. Similarly, three such pulses will be generated when the third first wheel aperture 53 aligns during three successive rotations and four such pulses will be generated for the fourth first wheel aperture 54. These clusters of pulses uniquely identify which of the four passpoint events has just occurred, and by detecting such pulses and noting their relative quantity, a given specific passpoint event can be so identified.

Referring again to FIG. 3, a housing comprised of two halves 31A and 31B can be provided as known in the art to contain the components described above and to shield the photobeam components 13A and 15A from ambient light. In general, the mechanical elements of the incremental movement sensor 13 and the passpoint event generator 15 can be comprised of plastic or such other material as may be suitable to a given application. Other aspects and features of an incremental movement sensor 13 and a passpoint event generator 15 are well understood in the art, and hence will not be related here for the sake of brevity and the preservation of focus.

So configured and pursuant to at least some of these embodiments, incremental movement of an object as it moves from a first position to a second position along a substantially predetermined path is automatically monitored. At the same time, from time to time, a plurality of passpoint events are generated, wherein at least some (and preferably all) of the passpoint events include a unique corresponding identifier. These passpoint events are automatically detected to determine which, if any, constitute a previously accepted passpoint event. When such a passpoint event is detected, that event is then used to automatically calibrate the subsequent monitoring of the incremental movement of the object.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, some of the passpoint event apertures in the first wheel 15B could be of similar size. Though resulting passpoint events as associated with such similarly sized apertures would not necessarily be unique as compared to one another, such passpoint events might nevertheless have some useful application in at least some settings. As another example, additional wheels having other aperture patterns could be employed if desired. As yet another example, three, four, or more such wheels could be used if desired. Also, in these embodiments, the photonic energy beam is either substantially passed or occluded. If desired, other modes of interaction could be employed. For example, reflective surfaces could be used to reflect the photobeam in a desired way to signal a corresponding alignment.

We claim:

1. A method for use with a movable barrier operator comprising:

automatically monitoring incremental movement of an object along a substantially predetermined path;

automatically detecting a passpoint event that is characterized by at least one indicia that uniquely identifies a particular passpoint;

automatically determining whether the at least one indicia corresponds to a particular previously accepted passpoint;

when the indicia corresponds to the particular previously accepted passpoint, automatically calibrating the monitoring of the incremental movement of the object as a function, at least in part, of the passpoint event.

2. The method of claim 1 wherein automatically monitoring incremental movement of an object includes automatically monitoring incremental movement of a movable barrier.

3. The method of claim 1 and further comprising moving the object by use of a motor.

4. The method of claim 3 wherein automatically monitoring incremental movement of an object includes automatically monitoring incremental movement of the object as a function of revolutions per minute of the motor.

5. The method of claim 4 and further comprising providing a plurality of passpoint events as the object moves along the substantially predetermined path.

6. The method of claim 5 wherein providing a plurality of passpoint events includes providing at least some passpoint events that each comprise a corresponding indicia that uniquely identifies a particular passpoint.

7. The method of claim 6 wherein providing at least some passpoint events that each comprise a corresponding indicia that uniquely identifies a particular passpoint includes providing at least some passpoint events that each comprise a corresponding indicia, including a unique number of electric pulses, that uniquely identifies a particular passpoint.

8. The method of claim 7 wherein providing at least some passpoint events that each comprise a corresponding indicia, including a unique number of electric pulses, that uniquely identifies a particular passpoint includes providing at least some passpoint events that each comprise a corresponding indicia, including a unique number of electric pulses that have at least a predetermined relationship with respect to one another, that uniquely identifies a particular passpoint.

9. The method of claim 1 wherein automatically calibrating the monitoring of the incremental movement of the object as a function, at least in part, of the passpoint event includes automatically re-initiating a count of incremental movements of the object as a function of detection of the passpoint.

10. A method for use with a movable barrier operator comprising:

automatically monitoring incremental movement of an object along a substantially predetermined path;

automatically detecting a plurality of passpoint events as the object moves along the substantially predetermined path;

automatically detecting, for at least some of the plurality of passpoint events, a corresponding identifier;

automatically distinguishing between at least some of the plurality of passpoint events as a function, at least in part, of the corresponding identifiers.

11. The method of claim 10 wherein automatically detecting, for at least some of the plurality of passpoint events, a corresponding identifier includes automatically detecting, for each of the plurality of passpoint events, a corresponding identifier.

12. The method of claim 11 wherein automatically distinguishing between at least some of the plurality of passpoint events as a function, at least in part, of the corresponding identifiers includes automatically distinguishing between all of the plurality of passpoint events as a function, at least in part, of the corresponding identifiers.

13. The method of claim 10 and further comprising automatically calibrating the monitoring of the incremental movement of the object as a function, at least in part, of at least one of the corresponding identifiers.

14. The method of claim 13 wherein automatically calibrating the monitoring of the incremental movement of the object includes re-initiating a count of incremental movements of the object.

15. The method of claim 14 wherein re-initiating a count of incremental movements of the object includes re-initiating a count of incremental movements of the object only in response to detection of one unique passpoint event identifier.

16. The method of claim 13 wherein automatically calibrating the monitoring of the incremental movement of the object includes at least one of automatically confirming a present count of incremental movement of the object and automatically modifying a present count of incremental movement of the object.

17. A method for use with a movable barrier operator comprising:

moving an object from a first position to a second position along a substantially predetermined path;

automatically monitoring incremental movement of the object while the object is moving;

automatically detecting a plurality of passpoint events while the object is moving from the first position to the second position;

automatically selecting at least one of the passpoint events as an accepted passpoint;

automatically subsequently using the at least one accepted passpoint to automatically calibrate subsequent monitoring of incremental movement of the object as a function, at least in part, of the accepted passpoint.

18. The method of claim 17 wherein moving an object includes moving a movable barrier.

19. The method of claim 17 wherein automatically detecting a plurality of passpoint events includes automatically detecting a plurality of passpoint events wherein at least some of the passpoint events comprise a unique identifier.

20. The method of claim 19 wherein automatically detecting a plurality of passpoint events wherein at least some of the passpoint events comprise a unique identifier includes automatically detecting a plurality of passpoint events wherein all of the passpoint events comprise a unique identifier.

21. The method of claim 20 wherein automatically subsequently using the at least one accepted passpoint to automatically calibrate subsequent monitoring of incremental movement of the object as a function, at least in part, of the accepted passpoint includes automatically detecting the unique identifier to detect the accepted passpoint.

22. A movable barrier operator for use with a movable object that moves a substantially predetermined distance between a first location and a second location, the movable barrier operator comprising:

an incremental-movement sensor having an input that is responsive to movement of the object and an output that corresponds to incremental movement of the object;

a passpoint event generator having an input that is response to movement of the object and a unique passpoint indicia output that provides at least two unique passpoint indicia when the movable object has moved a given predetermined distance that is less than the substantially predetermined distance;

a distance measuring unit that is responsive to the incremental-movement sensor;

a distance measuring unit calibrator that is operably coupled to the distance measuring unit and the passpoint event generator and that is responsive to at least one previously identified unique passpoint indicia;

such that incremental measurement of movement by the movable object is calibrated, at least in part, by detection of at least one previously identified unique passpoint indicia.

23. The movable barrier operator of claim 21 wherein the incremental-movement sensor comprises a revolutions sensor.

24. The movable barrier operator of claim 23 wherein the revolutions sensor is operably coupled to a motor that is operably coupled to the movable object.

25. The movable barrier operator of claim 22 wherein the passpoint event generator includes at least a first geared wheel having a predetermined energy-interface pattern formed therewith.

26. The movable barrier operator of claim 25 wherein the predetermined energy-interface pattern comprises light-passing apertures.

27. The movable barrier operator of claim 25 wherein the predetermined energy-interface pattern comprises light-occluding surfaces.

28. The movable barrier operator of claim 25 wherein the predetermined energy-interface pattern comprises light-reflecting surfaces.

29. The movable barrier operator of claim 25 wherein the passpoint event generator includes at least a second geared wheel having a second predetermined energy-interface pattern formed therewith.

30. The movable barrier operator of claim 29 wherein the energy-interface pattern of the first geared wheel and the second predetermined energy-interface pattern of the second geared wheel both move in response to rotation of a motor output shaft.

31. The movable barrier operator of claim 22 wherein the passpoint event generator includes passpoint generation means for providing the unique passpoint indicia as a function, at least in part, of corresponding movement of the movable object.

32. The movable barrier operator of claim 31 wherein the passpoint generation means further provides a plurality of unique passport indicia as the movable object moves between the first location and the second location.

33. The movable barrier operator of claim 32 wherein the distance measuring unit calibrator includes calibration means for at least one of confirming a present count of incremental measurement of movement of the movable object and modifying a present count of incremental measurement of movement of the movable object as a function, at least in part, to a previously identified unique passport indicia.

34. The movable barrier operator of claim 22 wherein modifying a present count includes reinitiating the present count.

35. A movable barrier operator for use with a movable object that moves a substantially predetermined distance between a first location and a second location, the movable barrier operator comprising:

first means for detecting incremental movement of the object;

second means for providing a plurality of passpoint events during movement of the object, wherein at least some of the passpoint events are comprised of a unique passpoint indicia;

third means responsive to the first means and the second means for tracking a distance as traveled by the object and for calibrating the tracking as a function, at least in part, of at least one of the unique passpoint indicia.

36. The movable barrier operator of claim 35 wherein the first means comprises a revolutions per minute sensor.

37. The movable barrier operator of claim 35 wherein the object comprises a movable barrier.

38. The movable barrier operator of claim 35 and further comprising motive means for selectively causing the object to move.

39. The movable barrier operator of claim 38 wherein the second means comprises at least two gear wheels that move with respect to movement of the motive means.

40. The movable barrier operator of claim 39 wherein the two gear wheels each include a corresponding energy-interface pattern.

41. The movable barrier operator of claim 40 wherein the energy-interface pattern for each of the two gear wheels interacts with a predetermined type of photonic energy in a predetermined way.

42. The movable barrier operator of claim 41 wherein the predetermined way includes at least one of substantially passing the photonic energy, substantially occluding the photonic energy, and substantially reflecting the photonic energy.

43. The movable barrier operator of claim 35 wherein the third means calibrates the tracking by at least one of confirming a count that relates to incremental movement of the object and modifying the count.

44. The movable barrier operator of claim 43 wherein modifying the count comprises at least one of re-initiating the count and changing the count by one of advancing and retarding the count.

* * * * *

UNITED STATES PATENT AND TRADEMARK OFFICE
CERTIFICATE OF CORRECTION

PATENT NO. : 6,895,355 B2
DATED : May 17, 2005
INVENTOR(S) : Fitzgibbon

It is certified that error appears in the above-identified patent and that said Letters Patent is hereby corrected as shown below:

Column 11,
Line 46, change "passport" to -- passpoint --.

Column 12,
Line 2, change "passport" to -- passpoint --.

Signed and Sealed this

Eleventh Day of October, 2005

JON W. DUDAS
*Director of the United States Patent and Trademark Office*